(12) United States Patent
Imai

(10) Patent No.: US 10,228,611 B2
(45) Date of Patent: *Mar. 12, 2019

(54) PROJECTOR, PROJECTION SYSTEM, AND CONTROL METHOD OF PROJECTOR

(71) Applicant: SEIKO EPSON CORPORATION, Matsumoto-shi, Nagano-ken (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,368

(22) Filed: Aug. 29, 2017

(65) Prior Publication Data

US 2017/0363937 A1 Dec. 21, 2017

Related U.S. Application Data

(63) Continuation of application No. 14/560,317, filed on Dec. 4, 2014, now Pat. No. 9,817,301.

(30) Foreign Application Priority Data

Dec. 20, 2013 (JP) .................... 2013-263649

(51) Int. Cl.
G03B 21/14 (2006.01)
G06F 3/03 (2006.01)

(52) U.S. Cl.
CPC ........... *G03B 21/142* (2013.01); *G03B 21/14* (2013.01); *G06F 3/0304* (2013.01); *G03B 2206/00* (2013.01)

(58) Field of Classification Search
CPC ...... G06F 3/0346; G06F 3/041; G06F 3/0421; G06F 3/033; G06F 3/03542; G06F 3/03545; G06F 3/0386; G06F 3/005; G03B 21/14; G03B 21/003; G03B 21/005; G03B 21/2086
See application file for complete search history.

(56) References Cited

U.S. PATENT DOCUMENTS

| 8,780,083 | B2 | 7/2014 | Tanaka |
| 2008/0291164 | A1 | 11/2008 | Tanaka |
| 2011/0210945 | A1 | 9/2011 | Fujinawa |
| 2012/0235019 | A1 | 9/2012 | Kiyose et al. |
| 2012/0313910 | A1 | 12/2012 | Haraguchi et al. |
| 2014/0284481 | A1 | 9/2014 | Kiyose et al. |
| 2015/0204658 | A1 | 7/2015 | Tamura |
| 2015/0204979 | A1 | 7/2015 | Naess et al. |

(Continued)

FOREIGN PATENT DOCUMENTS

| CN | 102331884 A | 1/2012 |
| JP | 2004-21218 A | 1/2004 |

(Continued)

OTHER PUBLICATIONS

Oct. 7, 2016 Office Action Issued in U.S. Appl. No. 14/560,317.

*Primary Examiner* — William C Dowling
(74) *Attorney, Agent, or Firm* — Oliff PLC

(57) ABSTRACT

A projection system includes a projector and a light emitting device that emits detection light in a direction in response to a screen. The projector detects an operation to the screen based on detection light of the light emitting device by a position detection section and switches the light emitting device between an emission mode and a non-emission mode thereof in response to state of the projector.

10 Claims, 6 Drawing Sheets

(56) References Cited

U.S. PATENT DOCUMENTS

| | | |
|---|---|---|
| 2015/0205345 A1 | 7/2015 | Naess et al. |
| 2015/0205376 A1 | 7/2015 | Kubota |
| 2016/0093035 A1 | 3/2016 | Honda |
| 2016/0259486 A1 | 9/2016 | Fujimori |

FOREIGN PATENT DOCUMENTS

| | | |
|---|---|---|
| JP | 2005-128693 A | 5/2005 |
| JP | 2007-213197 A | 8/2007 |
| JP | 2008-052366 A | 3/2008 |
| JP | 2012-189532 A | 10/2012 |
| JP | 2012-256000 A | 12/2012 |

PROJECTOR, PROJECTION SYSTEM, AND CONTROL METHOD OF PROJECTOR

This application is a continuation of U.S. application Ser. No. 14/560,317 filed Dec. 4, 2014, which is based on and claims priority under 35 U.S.C. 119 from Japanese Patent Application No. 2013-263649, filed Dec. 20, 2013, the entire disclosures of which are expressly incorporated by reference herein.

BACKGROUND

1. Technical Field

The present invention relates to a projector, a projection system, and a control method of the projector.

2. Related Art

In the related art, a projector for projecting an image on a screen is known (for example, see JP-A-2004-21218). Furthermore, in the related art, a coordinate input apparatus of a light shielding type in which a point position is detected by projecting light on a coordinate input region that detects points input and detecting reflected light is known (for example, JP-A-2008-52366).

A method for detecting the point position as described in JP-A-2008-52366 is considered to be applied to a projector. However, as described in JP-A-2004-21218, the projector has various operation states such as a sleep mode or a standby state. Furthermore, as described in JP-A-2008-52366, a method for detecting the point position by using reflection of the light may not be applied depending on the installation method of the projector. That is, the detection of the point position using the reflected light may not be performed depending on the operation state or the installation method of the projector and in such a case, projecting the light is wasteful.

SUMMARY

An advantage of some aspects of the invention is to prevent unnecessary projection of light in a case where a function for detecting a point position by performing projection of the light is applied to a projector.

An aspect of the invention is directed to a projector that projects an image on a projection surface, the projector including: a detection section that detects an operation to the projection surface; and an emission control section that switches a mode of a light emitting section, which emits detection light that is used for detection by the detection section, between an emission mode and a non-emission mode in response to the state of the projector.

With this configuration, the projector detecting the operation by using the detection light switches the mode of the detection light between emission and non-emission in response to the state of the projector. Thus, it is possible to stop the emission of the detection light in a case where the detection light is not necessary, a case where emission of the detection light is not appropriate, or the like. In addition, it is possible to suppress power consumption and to increase the lifetime of a light source of the light emitting section.

Another aspect of the invention is directed to the projector described above, wherein the emission control section switches the mode of the light emitting section between the emission mode and the non-emission mode in response to an installation state of a body of the projector.

With this configuration, it is possible to automatically switch the detection light between the emission and non-emission thereof according to the installation state of the body of the projector. Thus, it is possible to stop the emission of the detection light in a case where the detection light is not necessary, a case where emission of the detection light is not appropriate, or the like without a complicated operation.

Still another aspect of the invention is directed to the projector described above, wherein the emission control section causes the light emitting section to be in the non-emission mode when an abnormal operation of a type set in advance in the projector occurs.

With this configuration, since the detection light is not emitted when the abnormal operation of the projector occurs, it is possible to prevent emission of unnecessary detection light. Furthermore, in an operation for returning the projector from the abnormal operation, it is possible to eliminate labor to stop the emission of the detection light and to improve operation efficiency.

Yet another aspect of the invention is directed to the projector described above, wherein the projector further includes a setting control section that accepts a setting operation in a state where a setting screen is projected on the projection surface, and the setting control section does not accept the setting operation of a function of the light emitting section when the light emitting section is in the non-emission mode by the emission control section.

With this configuration, since the setting of the function using the detection light is not accepted in a state where the detection light is not emitted, it is possible to prevent setting of a function that cannot be realized.

Still yet another aspect of the invention is directed to the projector described above, wherein the setting control section does not accept the setting operation of a function of the light emitting section when connection of the light emitting section cannot be detected.

With this configuration, since the setting of the function using the detection light is not accepted in a state where the detection light cannot be emitted, it is possible to prevent setting of a function that cannot be realized.

Further another aspect of the invention is directed to the projector described above, wherein the detection section detects reflected light that is made by the detection light reflected on a pointing body that performs an operation to the projection surface.

With this configuration, it is possible to efficiently detect the operation of the pointing body by detecting the reflected light that is reflected on the pointing body. Furthermore, it is possible to prevent unnecessary emission by making the light emitting section be in the non-emission mode when the emission of the detection light is not necessary such as when the projector does not detect the operation.

Still further another aspect of the invention is directed to the projector described above, wherein the detection section has a function for detecting the reflected light reflected on the pointing body and a function for detecting light emitted by a light-emitting pointing body that performs an operation to the projection surface, and detects an operation of the light-emitting pointing body and an operation of the pointing body by distinguishing the operation of the light-emitting pointing body and the operation of the pointing body based on a difference between timing at which the light-emitting pointing body emits the light and timing at which the light emitting section emits the detection light.

With this configuration, it is possible to perform the operation by using the light-emitting pointing body including an emitting function and the pointing body reflecting the detection light. In addition, it is possible to distinguish the light-emitting pointing body and the pointing body by the difference between the timing at which the light-emitting pointing body emits the light and the timing at which the pointing body reflects the detection light. Thus, it is possible to use a plurality of mixed point bodies and to detect the operations of each pointing body by distinguishing the operations.

Yet further another aspect of the invention is directed to the projector described above, wherein the emission control section controls emission of the light emitting section so that the timing at which the light-emitting pointing body emits the light and the timing at which the light emitting section emits the detection light do not match each other.

With this configuration, adjustment between the timing at which the light is emitted and the timing at which the pointing body reflects the detection light is performed by adjusting the timing at which the detection section receives the reflected light. Therefore, it is possible to detect the operations of the light-emitting pointing body and the pointing body by distinguishing the operations.

Still yet further another aspect of the invention is directed to the projector described above, which further includes a unit that gives the light-emitting pointing body an instruction on the timing at which the light-emitting pointing body emits the light.

With this configuration, adjustment between the timing at which the light is emitted and the timing at which the pointing body reflects the detection light is performed by the pointing timing at which the light-emitting pointing body emits the light. Therefore, it is possible to detect the operations of the light-emitting pointing body and the pointing body by distinguishing the operations.

A further aspect of the invention is directed to the projector described above, wherein the light emitting section that is configured as a separate body from a body of the projector is connected to the projector.

With this configuration, it is possible to switch the light emitting section that is configured as the separate body from the body of the projector between the emission and the non-emission thereof.

A still further aspect of the invention is directed to a projection system including: a projector that projects an image on a projection surface; and a light emitting device that is connected to the projector and emits detection light in a direction toward the projection surface. The projector includes a detection section that detects an operation to the projection surface based on the detection light of the light emitting device, and an emission control section that switches a mode of the light emitting device between an emission mode and a non-emission mode in response to a state of the projector.

With this configuration, the projector detecting the operation by using the detection light switches the detection light between emission and non-emission in response to the state of the projector. Thus, it is possible to stop the emission of the detection light in a case where the detection light is not necessary, a case where emission of the detection light is not appropriate, or the like. Thus, it is possible to suppress power consumption and to increase the lifetime of a light source of the light emitting section.

A yet further aspect of the invention is directed to a method of controlling a projector projecting an image on a projection surface, the method including: detecting an operation to the projection surface, based on detection light emitted in a direction toward the projection surface by a light emitting section; and switching a mode of the light emitting section between an emission mode and a non-emission mode in response to the state of the projector.

With this configuration, the projector detecting the operation by using the detection light switches the detection light between the emission and non-emission in response to the state of the projector. Thus, it is possible to stop the emission of the detection light in a case where the detection light is not necessary, a case where emission of the detection light is not appropriate, or the like. Thus, it is possible to suppress power consumption and to increase the lifetime of a light source of the light emitting section.

According to the aspects of the invention, the projector that detects the operation by using the detection light can stop the emission of the detection light in a case where the detection light is not necessary, a case where emission of the detection light is not appropriate, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
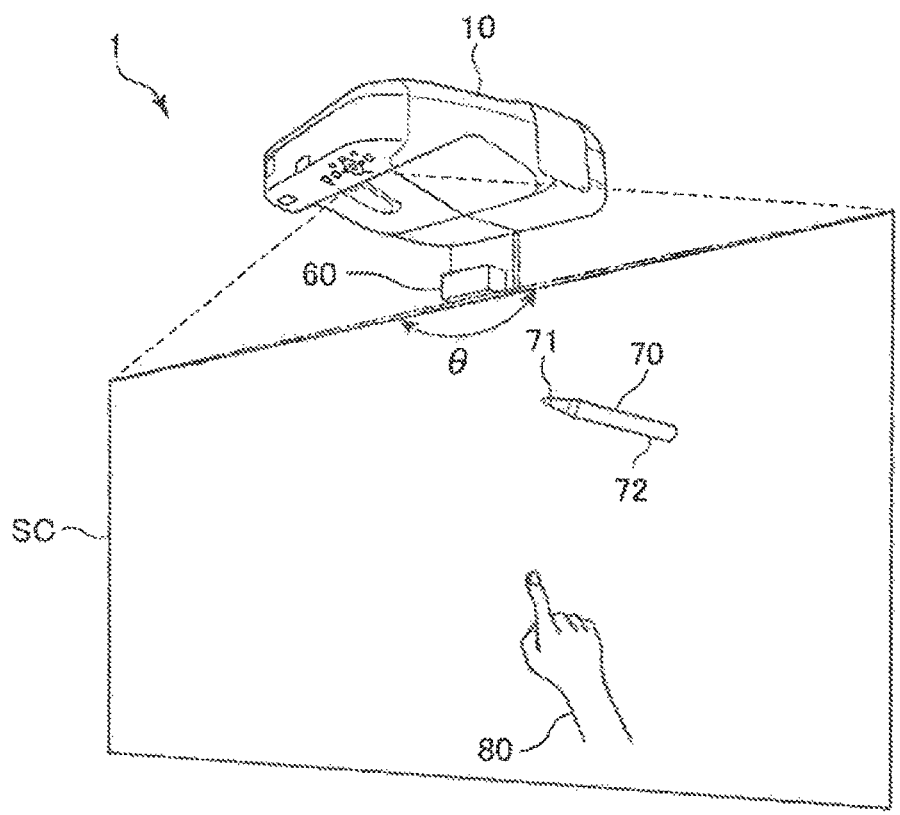
FIG. 1 is a view illustrating a schematic configuration of a projection system according to an embodiment.

FIG. 1 is a view illustrating a configuration of a projection system 1 according to an embodiment to which the invention is applied. The projection system 1 includes a projector 10 installed above a screen SC (projection surface) and a light emitting device 60 (light emitting section) installed in an upper portion of the screen SC.

The projector 10 is installed directly above or obliquely above the screen SC and projects an image toward the screen SC that is obliquely below the projector 10. Furthermore, the screen SC exemplified in the embodiment is a plate or curtain that is fixed to a wall or erected on a floor surface. The invention is not limited to such an example and may use the wall surface as the screen SC. In this case, the projector 10 and the light emitting device 60 may be mounted on the upper portion of the wall surface that is used as the screen SC.

The projector 10 is connected to an external image supply device such as a personal computer (PC), a video playback device, and a DVD playback device, and projects an image on the screen SC, based on an analog image signal or a digital image signal supplied from the image supply device. Furthermore, the projector 10 may be configured to read image data stored in a built-in storage section 110 (FIG. 2) or a storage medium connected to the outside and display the image on the screen SC based on the image data.

The light emitting device 60 has a light source section 61 (FIG. 2) configured of a solid light source and emits (illuminates) light (infrared light in the embodiment) emitted from the light source section 61 by spreading the light along the screen SC. An emission range of the light emitting device 60 is indicated in an angle θ in FIG. 1. The light emitting device 60 is installed above an upper end of the screen SC and emits the light downward in the range of the angle θ, and the light forms a layer of the light along the screen SC. In the embodiment, the angle θ is approximately 180 degrees and the layer of the light is formed on substantially the entirety of the screen SC. It is preferable that the surface of the screen SC is close to the layer of the light and in the embodiment, a distance between the surface of the screen SC and the layer of the light is within a range of approximately 10 mm to 1 mm.

When a point operation is performed with respect to the screen SC, the projection system 1 detects a point position by the projector 10.

A pointing body that is used for the point operation may use a pen type pointing body 70 (light-emitting pointing body). Since a leading end portion 71 of the pointing body 70 has a built-in operation switch 75 (FIG. 2) that operates when being pressed, the operation switch 75 is turned ON when an operation that presses the leading end portion 71 on the wall or the screen SC is performed. The pointing body 70 is operated in such a manner that a user holds a rod-shaped shaft section 72 in his or her hand and the leading end portion 71 comes into contact with the screen SC. In addition, an operation that presses the leading end portion 71 onto the screen SC is also performed. The leading end portion 71 includes a transceiver 74 (FIG. 2) emitting infrared light. The projector 10 detects a position of the leading end portion 71 as the point position, based on the infrared light emitted by the pointing body 70.

Furthermore, when performing a position point operation by a pointing body 80 that is a finger of the user, the finger of the user comes into contact with the screen SC. In this case, a position in which the pointing body 80 comes into contact with the screen SC is detected.

That is, when a leading end (for example, the finger tip) of the pointing body 80 comes into contact with the screen SC, the layer of the light formed by the light emitting device 60 is blocked. At this time, the light emitted by the light emitting device 60 hits and reflects on the pointing body 80, and the reflected light advances from the pointing body 80 toward the light emitting device 60. Since the projector 10 has a function for detecting the light from the screen SC side, that is, the light from below by a position detection section 50 (described below), it is possible to detect the reflected light of the pointing body 80. The projector 10 detects the reflected light reflected on the pointing body 80, thereby detecting the point operation to the screen SC by the pointing body 80. Furthermore, the projector 10 detects the point position that is pointed by the pointing body 80.

Since the layer of the light emitted by the light emitting device 60 is close to the screen SC, a position on which the light is reflected in the pointing body 80 may be regarded as the leading end or the point position that is closest to the screen SC. Thus, the point position can be specified based on the reflected light of the pointing body 80.

The projection system 1 functions as an interactive whiteboard system and detects the point operation performed by an operator using the point bodies 70 and 80, and reflects the point position to a projected image.

Specifically, the projection system 1 performs a process in which a diagram is drawn or a character or a symbol is disposed in the point position, a process in which the diagram is drawn along a trajectory of the point position, a process in which the drawn diagram or the disposed character or symbol is deleted, and the like. Furthermore, the drawn diagram and the disposed character or symbol on the screen SC can be saved as image data and can also be output to an external device.

Furthermore, the projection system 1 operates as a pointing device by detecting the point position and may output coordinates of the point position in an image projection region to which the projector 10 projects the image on the screen Sc. In addition, the projection system 1 may perform a graphical user interface (GUI) operation using the coordinates.

Figure 2:
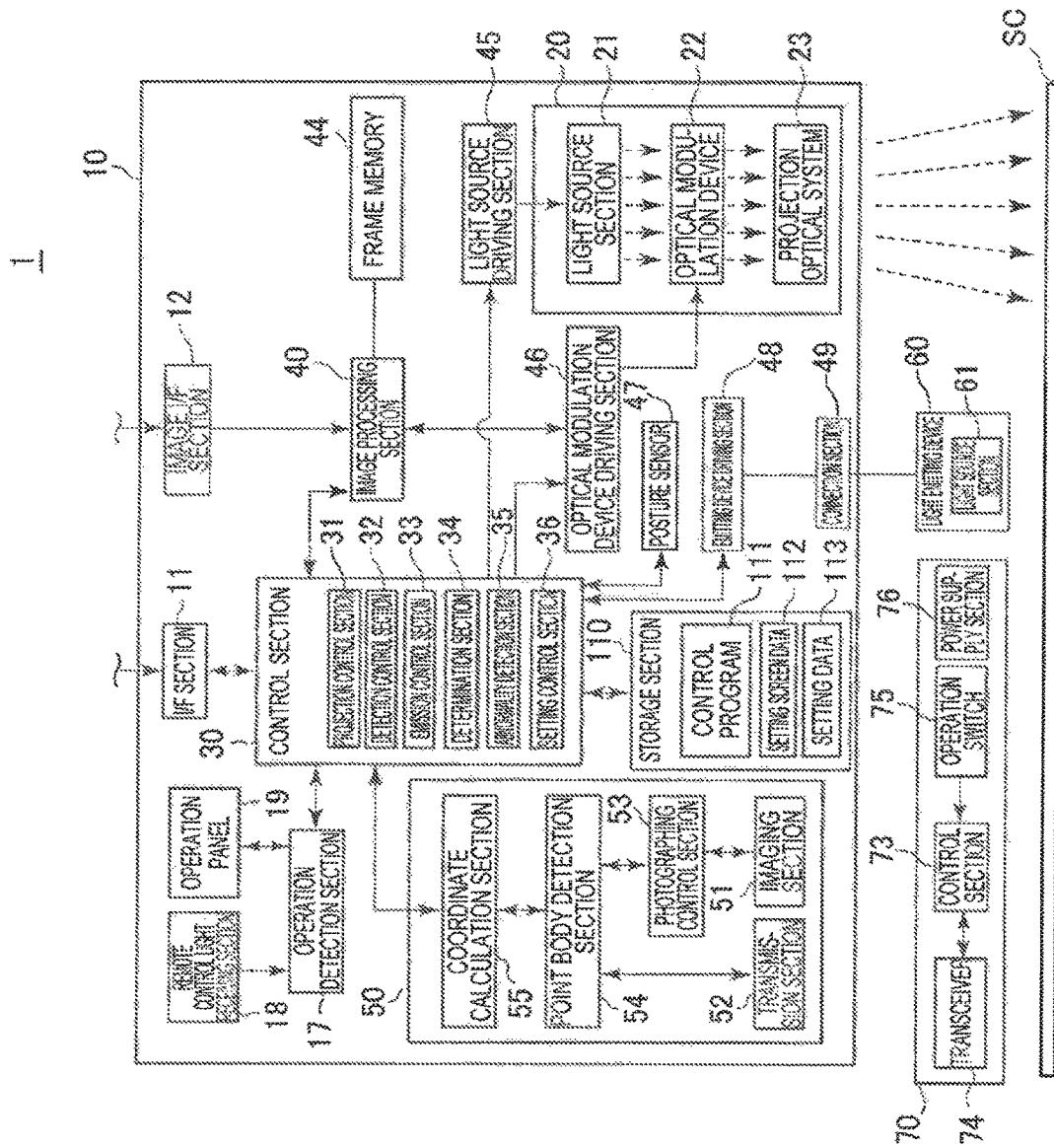
FIG. 2 is a functional block view of the projection system.

FIG. 2 is a functional block view of each section configuring the projection system 1.

The projector 10 includes an interface (I/F) section 11 and an image interface (I/F) section 12 as interfaces connected to the external device. The I/F section 11 and the image I/F section 12 include connectors for wired connection and may include interface circuits corresponding to the connectors. Furthermore, the I/F section 11 and the image I/F section 12 may include wireless communication interfaces. The connector for wired connection and the interface circuit may be those in accordance with wired LAN, IEEE1394, USB, and the like. Furthermore, the wireless communication interface may be those in accordance with wireless LAN, Bluetooth (registered trademark), and the like. As the image I/F section 12, an interface for the image data such as an HDMI (registered trademark) interface may be used. The image I/F section 12 may include an interface into which audio data is input.

The I/F section 11 is an interface transmitting and receiving various types of data to and from the external device such as PC. The I/F section 11 inputs and outputs control data regarding projection of the image, setting data setting the operation of the projector 10, coordinate data of the point position detected by the projector 10, and the like. A control section 30 (described below) has a function for transmitting and receiving the data to and from the external device through the I/F section 11.

The image I/F section 12 is an interface into which the digital image data is input. The projector 10 of the embodiment projects the image based on the digital image data input through the image I/F section 12. Moreover, the projector 10 may have a function for projecting the image based on the analogue image signal and, in this case, the image I/F section 12 may include an interface for the analogue image and an A/D conversion circuit converting the analogue image signal into the digital image data.

The projector 10 includes a projection section 20 performing formation of an optical image. The projection section 20 has a light source section 21, an optical modulation device 22, and a projection optical system 23. The light source section 21 includes a light source configured of a xenon lamp, an ultra-high pressure mercury lamp, a light emitting diode (LED), a laser light source, or the like. Furthermore, the light source section 21 may include a reflector and an auxiliary reflector guiding the light emitted by the light source to the optical modulation device 22. Furthermore, a lens group (not illustrated) for increasing optical characteristics of the projection light, a polarizing plate, a light control device for reducing a light amount of the light emitted by the light source on a path leading to the optical modulation device 22, and the like may be provided.

For example, the optical modulation device 22 includes three transmissive liquid crystal panels corresponding to three primary colors of RGB and generates image light by modulating the light transmitted through the liquid crystal panels. The light from the light source section 21 is separated into color light beams of three colors of RGB and each color light beam is incident on each corresponding liquid crystal panel. The color light beams modulated by being transmitted through liquid crystal panels are combined by a combination optical system such as a cross dichroic prism and are emitted to the projection optical system 23.

The projection optical system 23 includes a lens group that guides the image light modulated by the optical modulation device 22 to the direction of the screen SC and focuses the image on the screen SC. Furthermore, the projection optical system 23 may include a zoom mechanism performing adjustment of an increase and decrease of the projected image of the screen SC, and adjustment of the focus, and a focus adjustment mechanism performing the adjustment of the focus. If the projector 10 is a short-focus type, the projection optical system 23 may be provided with a concave mirror for reflecting the image light toward the screen SC.

The projection section 20 is connected to a light source driving section 45 for turning on the light source section 21 according to control of the control section 30 and an optical modulation device driving section 46 for operating the optical modulation device 22 according to the control of the control section 30. The light source driving section 45 has a function for performing switching lighting of the light source section 21 on/off and for adjusting the light amount of the light source section 21.

The projector 10 includes an image processing system that processes the image projected by the projection section 20. The image processing system includes the control section 30 controlling the projector 10, the storage section 110, an operation detection section 17, an image processing section 40, the light source driving section 45, and the optical modulation device driving section 46. Furthermore, a frame memory 44 is connected to the image processing section 40 and a posture sensor 47, an emitting device driving section 48, and the position detection section 50 are connected to the control section 30. Each section may be included in the image processing section.

The control section 30 controls each section of the projector 10 by performing a predetermined control program 111. The storage section 110 stores the control program 111 that is performed by the control section 30 and data that is processed by the control section 30 in a nonvolatile manner. The storage section 110 stores setting screen data 112 of the screen for setting the operation of the projector 10 and setting data 113 indicating contents that are set by using the setting screen data 112.

The image processing section 40 processes the image data input through the image I/F section 12 according to the control of the control section 30 and outputs the image signal to the optical modulation device driving section 46. The processes that are performed by the image processing section 40 are a determination process of 3D (stereoscopic) image and 2D (plane) image, a resolution conversion process, a frame rate conversion process, a distortion correction process, a digital zoom process, a color correction process, a brightness correction process, and the like. The image processing section 40 performs a process that is designated by the control section 30 and performs a process using a parameter input from the control section 30, if necessary. Furthermore, of course, processes by combining a plurality of processes described above may be performed.

The image processing section 40 has the frame memory 44. The image processing section 40 develops the image data input from the image I/F section 12 to the frame memory 44 and performs various processes described above with respect to the developed image data. The image processing section 40 reads the processed image data from the frame memory 44 and generates the image signals of R, G, and B corresponding to the image data, and outputs the image signals to the optical modulation device driving section 46.

The optical modulation device driving section 46 is connected to the liquid crystal panel of the optical modulation device 22. The optical modulation device driving section 46 drives the liquid crystal panel and draws the image on each liquid crystal panel based on the image signals input from the image processing section 40.

The operation detection section 17 is connected to a remote control light receiving section 18 and an operation panel 19 that function as input devices, and detects the operation through the remote control light receiving section 18 and the operation panel 19.

The remote control light receiving section 18 receives an infrared signal transmitted in response to a button operation of a remote controller (not illustrated) used by the operator of the projector 10 in the remote control light receiving section 18. The remote control light receiving section 18 decodes the infrared signal received from the remote controller described above, generates operation data indicating operation contents in the remote controller, and outputs the operation data to the control section 30.

The operation panel 19 is provided in an outer housing of the projector 10 and has various switches and indicator lamps. The operation detection section 17 appropriately turns on and off the indicator lamps of the operation panel 19 depending on the operation state or the setting state of the projector 10 according to the control of the control section 30. If the switch of the operation panel is operated, the operation data corresponding to the operated switch is output from the operation detection section 17 to the control section 30.

The emitting device driving section 48 is connected to the light emitting device 60 through a connection section 49. For example, the connection section 49 is a connector having a plurality of pins and the light emitting device 60 is connected to the projector 10 in a wired manner through the connection section 49. The pins of the connection section 49 are assigned to a pulse signal, a power supply, a GND, and the like. The emitting device driving section 48 generates the pulse signal according to the control of the control section 30 and outputs the pulse signal to the light emitting device 60 through the connection section 49. The pulse signal is a signal that PWM controls turning-on of the light source section 61 and a frequency of the pulse, an ON period, and an OFF period are controlled by the control section 30. The light source section 61 turns on and off at timing designated by the control section 30. Furthermore, the control section 30 can adjust the light amount of the light source section 61 by adjusting a duty of the ON period and the OFF period of the pulse. Furthermore, the emitting device driving section 48 supplies power supply to the light emitting device 60 through the connection section 49.

As illustrated in FIG. 1, the light emitting device 60 is configured by accommodating the light source section 61 and optical components in a substantially box-shaped case. The light emitting device 60 of the embodiment includes a solid light source in the light source section 61. As the solid light source, an infrared LED or an infrared laser diode is exemplified. The infrared light emitted by the solid light source is spread by a collimating lens and a Powell lens and forms a surface along the screen SC. Furthermore, the light source section 61 includes a plurality of solid light sources and the light beams emitted by the plurality of solid light sources are respectively spread and thereby the light beams may form the layer of the light so as to cover the image projection region of the screen SC. Furthermore, the light emitting device 60 may include an adjustment mechanism adjusting a distance or an angle between the layer of the light emitted by the light source section 61 and the screen SC.

The light emitting device 60 turns on the light source section 61 by the pulse signal and the power supply supplied by a cable connected to the connection section 49. For example, the pulse signal and the power supply input by the cable maybe input directly into the light source section 61. Therefore, the timing when the solid light source of the light source section 61 turns on and off can be controlled by the emitting device driving section 48. The control section 30 controls the emitting device driving section 48 and turns on the light source section 61 in synchronization with timing when an imaging section 51 performs photographing as described below.

The position detection section 50 (detection section) detects the operation by the point bodies 70 and 80. The position detection section 50 is configured by including each section of the imaging section 51, a transmission section 52, a photographing control section 53, a pointing body detection section 54, and a coordinate calculation section 55. The position detection section 50 functions as an operation detection unit.

The imaging section 51 has an imaging optical system, an imaging device, an interface circuit, and the like, and photographs a projection direction of the projection optical system 23. The imaging optical system of the imaging section 51 is disposed in the same direction as the projection optical system 23 and has an angle of view covering a range in which the projection optical system 23 projects the image on the screen SC. Furthermore, as the imaging device, there is a CCD or a CMOS which receives light from an infrared region or a visible light region. The imaging section 51 may include a filter blocking some light incident on the imaging device and, for example, may dispose the filter through which the light of the infrared region is mainly transmitted in front of the imaging device when the infrared light is received. In addition, the interface circuit of the imaging section 51 reads and outputs a detected value of the imaging device.

The photographing control section 53 performs the photographing by the imaging section 51 and generates photographed image data. When the imaging device performs the photographing of visible light, the image projected on the screen SC is photographed. The photographed image is, for example, used for a distortion correcting process for correcting a trapezoidal distortion or a pincushion distortion of the projected image. In addition, the photographing control section 53 can photograph infrared light through the imaging section 51 and, in this case, the infrared light (infrared signal) emitted by the pointing body 70 or the reflected light reflected on the pointing body 80 is captured in the photographed image.

The pointing body detection section 54 detects the point position of the point bodies 70 and 80 based on the photographed image data photographed by the photographing control section 53. The pointing body detection section 54 detects the image of the infrared light emitted by the pointing body 70 and/or the image of the reflected light reflected on the pointing body 80 from the photographed image data when the photographing control section 53 performs the photographing of the infrared light by the imaging section 51. Furthermore, the pointing body detection section 54 may determine whether the detected image is the image of the light emitted by the pointing body 70 or the image of the reflected light of the pointing body 80.

The coordinate calculation section 55 calculates the coordinate of the point position of the point bodies 70 and 80 in the photographed image data and outputs the coordinates of the point position to the control section 30 based on the position of the image detected by the pointing body detection section 54. The coordinate calculation section 55 calculates the coordinate of the point position of the point bodies 70 and 80 in the projected image projected by the projection section 20 and may output the coordinates of the point position to the control section 30. Furthermore, the coordinate calculation section 55 may calculate the coordinates of the point position of the point bodies 70 and 80 in the image data that is drawn by the image processing section 40 on the frame memory 44 or the coordinates of the point position of the point bodies 70 and 80 in the input image data of the image I/F section 12.

The transmission section 52 transmits the infrared signal with respect to the pointing body 70 according to the control of the pointing body detection section 54. The transmission section 52 has a light source such as an infrared LED and turns on and off the light source according to the control of the pointing body detection section 54.

Furthermore, the pointing body 70 includes a control section 73, the transceiver 74, the operation switch 75, and a power supply section 76, and each section is accommodated in the shaft section 72 (FIG. 1). The control section 73 is connected to the transceiver 74 and the operation switch 75, and detects an ON/OFF state of the operation switch 75. The transceiver 74 includes the light source such as the infrared LED and a light receiving element receiving the infrared light, turns on and off the light source according to the control of the control section 73, and outputs a signal indicating a light receiving state of the light receiving element to the control section 73.

The power supply section 76 has a dry cell or a secondary battery as the power supply, and supplies power to each section of the control section 73, the transceiver 74, and the operation switch 75.

The pointing body 70 may include a power supply switch turning ON/OFF the supply of power from the power supply section 76.

Here, a method for specifying the pointing body 70 from the photographed image data of the imaging section 51 by communication between the position detection section 50 and the pointing body 70 is described.

When detecting the position point operation by the pointing body 70, the control section 30 controls the pointing body detection section 54 and transmits the signal for the synchronization from the transmission section 52. That is, the pointing body detection section 54 turns on the light source of the transmission section 52 at a predetermined period according to the control of the control section 30. The infrared light periodically emitted by the transmission section 52 functions as the synchronizing signal that synchronizes the position detection section 50 with the pointing body 70.

On the other hand, the control section 73 causes the transceiver 74 to receive the infrared light emitted by the transmission section 52 of the projector 10 after the supply of power from the power supply section 76 is started and a predetermined initializing operation is performed. When the transceiver 74 receives the infrared light periodically emitted by the transmission section 52, the control section turns on (emits the light) the light source of the transceiver 74 in a predetermined pattern synchronized with the timing of the infrared light. The lighting pattern represents data that is specific to the pointing body 70 by corresponding to the turning on and off of the light source to ON and OFF data. The control section 73 turns on and off the light source according to a light on time and the light off time of the set pattern. The control section 73 repeatedly performs the pattern when power is supplied from the power supply section 76.

That is, the position detection section 50 periodically transmits the infrared signal for synchronization with respect to the pointing body 70 and the pointing body 70 transmits the infrared signal that is set in advance synchronized with the infrared signal that is transmitted by the position detection section 50.

The photographing control section 53 of the position detection section 50 performs control for matching photographing timing by the imaging section 51 to the timing when the pointing body 70 is turned on. The photographing timing is determined based on the timing when the pointing body detection section 54 turns on the transmission section 52. The pointing body detection section 54 can specify the pattern in which the pointing body 70 is turned on according to whether or not the image of the light of the pointing body 70 is captured in the photographed image data of the imaging section 51. Here, the control section 30 may synchronize the timing when the pointing body 70 transmits (emits the light) the infrared signal with the photographing timing of the imaging section 51. The control can be easily realized by adjusting the transmission timing of the infrared signal for the synchronization that is transmitted to the pointing body 70 by the position detection section 50 with reference to the timing when the photographing control section 53 causes the imaging section 51 to perform the photographing.

The pattern in which the pointing body 70 is turned on may include a pattern specific to each solid portion of the pointing body 70, a common pattern in a plurality of point bodies 70, and a pattern specific to an individual. In this case, if the images of the infrared light emitted by the plurality of point bodies 70 are included in the photographed image data, the pointing body detection section 54 can respectively distinguish the images as the images of different point bodies 70.

Furthermore, the control section 30 controls the emitting device driving section 48 and synchronizes the light-on timing of the light source section 61 with the photographing timing of the imaging section 51. When the light source section 61 is pulsed-turned on by matching to the photographing timing of the imaging section 51, the reflected light of the pointing body 80 is captured in the photographed image of the imaging section 51 if the pointing body 80 points on the screen SC. When the light source section 61 is turned on in a pattern that can be distinguished from the timing of the turning on of the pointing body 70, the pointing body detection section 54 can determine whether the image that is captured in the photographed image data is the pointing body 70 or the pointing body 80.

For example, a case where the light source section is turned on synchronized with an entirety of the photographing timing of the imaging section 51 and the pointing body 70 is turned on in a pattern of "1010101010" (1 indicates turning on and 0 indicates turning off) maybe considered. In this case, if comparing a plurality of continuous photographed image data articles, the image of the pointing body 70 and the image of the pointing body 80 can easily be distinguished. Therefore, if the pointing body 70 and the pointing body 80 are mixed and the position point operation is performed with respect to the screen SC, it is possible to detect the point operation of the pointing body 70 and the point operation of the pointing body 80 by distinguishing the operations.

Furthermore, the control section 73 included in the pointing body 70 switches the pattern in which the transceiver 74 is turned on in response to the operation state of the operation switch 75. Thus, the pointing body detection section 54 can determine the operation state of the pointing body 70, that is, whether or not the leading end portion 71 is pressed on the screen SC, based on the plurality of photographed image data articles.

The posture sensor 47 is configured of an acceleration sensor, a gyro sensor, and the like, and outputs the detected value to the control section 30. The posture sensor 47 is fixed to the body of the projector 10 so as to be capable of identifying an installation direction of the projector 10.

Figure 3A:
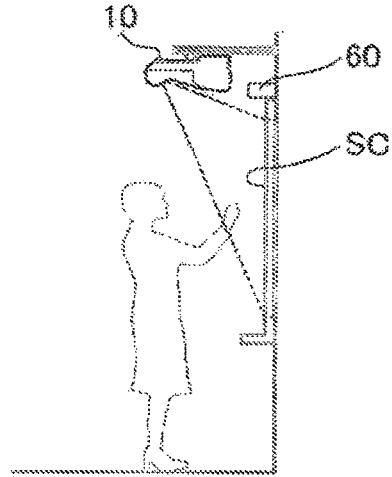
FIGS. 3A to 3D are views illustrating an example of an installation state of a projector.
Figure 3B:
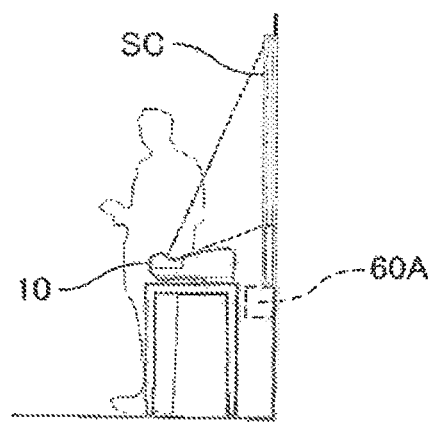
Figure 3C:
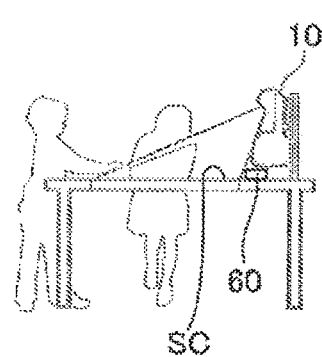
Figure 3D:
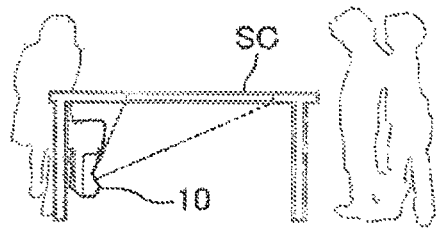

FIGS. 3A to 3D are views illustrating an example of the installation state of the projector 10. FIG. 3A illustrates a hanging installation, FIG. 3B illustrates a usual installation, FIG. 3C illustrates an on-desk installation, and FIG. 3D illustrates an on-desk rear surface installation.

The hanging installation of FIG. 3A is the same as the installation state illustrated in FIG. 1. In the installation state of FIG. 3B, the projector 10 is installed in front of and below the screen SC, and the projector 10 projects the image upward. In this case, the installation position of the light emitting device 60 may be considered to be installed in a position indicated by a symbol 60A below the screen SC.

However, when emitting the detection light upward from the light emitting device 60, the detection light is blocked by the arms, back, and the like of the user thereby not reaching the pointing body 80. Thus, the installation state of FIG. 3B is not suitable for use of the light emitting device 60.

In the on-desk installation state of FIG. 3C, a horizontal surface on the desk becomes the screen SC and the projector 10 projects the image from one end side of the screen SC. In this case, if the light emitting device 60 is installed on the same side as the projector 10 and emits the detection light toward the other end side of the screen SC, it is possible to detect the operation of the pointing body 80 similar to the hanging installation state of FIG. 3A. In the on-desk rear surface installation state of FIG. 3D, the horizontal surface on the desk becomes the screen SC and the projector 10 is installed on the rear surface side of the screen SC and performs rear-surface projection. The operation of the pointing body 80 is performed on the surface side of the screen SC, that is, on the upper side of the screen SC in the view. Thus, the surface is not in a position in which the detection light is emitted to the pointing body 80 and the reflected light reflected on the pointing body 80 can be detected by the projector 10. Therefore, the installation state of FIG. 3D is not suitable for use of the light emitting device 60.

For example, the posture sensor 47 is provided in the body of the projector 10 so as to distinguish four installation states illustrated in FIGS. 3A to 3D. On the basis of the usual installation state of FIG. 3B, in the installation state of FIG. 3A, top and bottom of the projector 10 is reversed and in FIGS. 3C and 3D, the projector 10 is inverted. Furthermore, in FIGS. 3C and 3D, the vertical direction of the projector 10 is reversed. Thus, for example, if the posture sensor 47 includes the gyro sensor of two axes, four installation states of FIGS. 3A to 3D are distinguished and the installation state of the projector 10 can be determined by the control section 30. Furthermore, for example, if the gyro sensor of one axis is installed by tilting a detection shaft with respect to the screen SC illustrated in FIGS. 3A to 3D, it is possible to distinguish the four installation states of FIGS. 3A to 3D based on an output value of the gyro sensor. If the acceleration sensor is used, similarly, it is also possible to distinguish the four installation states of FIGS. 3A to 3D.

The control section 30 realizes the functions of a projection control section 31, an emission control section 33, a determination section 34, an abnormality detection section 35, and a setting control section 36, and controls each section of the projector 10 by reading and executing the control program 111 stored in the storage section 110.

The projection control section 31 acquires contents of the operation that is performed by the operator, based on the operation data input from the operation detection section 17. The projection control section 31 controls the image processing section 40, the light source driving section 45, and the optical modulation device driving section 46 in response to the operation that is performed by the operator, and projects the image on the screen SC. The projection control section 31 controls the image processing section 40 and performs the determination process of a 3D (stereoscopic) image and 2D (plane) image, the resolution conversion process, the frame rate conversion process, the distortion correction process, the digital zoom process, the color correction process, the brightness correction process, and the like described above. In addition, the projection control section 31 controls the light source driving section 45 and controls the light amount of the light source section 21 according to the process of the image processing section 40.

A detection control section 32 controls the position detection section 50, performs the detection of the operation position of the point bodies 70 and 80, and acquires the coordinates of the operation position. In addition, the detection control section 32 acquires data identifying whether it is the operation position of the pointing body 70 or the operation position of the pointing body 80 and data indicating the operation state of the operation switch 75 together with the coordinates of the operation position. The detection control section 32 performs a predetermined process, based on the acquired coordinates and the data. For example, a process in which the diagram is drawn, the drawn diagram is overlapped on the input image that is input into the image I/F section 12, and the drawn diagram is projected based on the acquired coordinate is performed by the image processing section 40. Furthermore, the detection control section 32 may output the acquired coordinate to the external device such as the PC connected to the I/F section 11. In this case, the detection control section 32 converts the acquired coordinates into a data format that is recognized as an input of a coordinate input device in an operating system of the external device connected to the I/F section 11, and outputs. For example, if a PC mode that is operated by a Windows (registered trademark) operating system is connected to the I/F section 11, data that is processed as the input data of a human interface device (HID) in the operating system is output. In addition, the detection control section 32 may output the data identifying whether it is the operation position of the pointing body 70 or the operation position of the pointing body 80 and the data indicating the operation state of the operation switch 75 together with the data of the coordinates.

Furthermore, the detection control section 32 may perform calibration for detecting the point position of the point bodies 70 and 80. For example, the calibration is a process of associating the point position in the photographed image data of the imaging section 51, the coordinate in the image drawn in the frame memory 44, and the coordinate in the input image of the image I/F section 12.

In addition, the detection control section 32 controls the detection of the position using the pointing body 80. Specifically, the detection control section 32 determines whether or not the light emitting device 60 can be used, based on presence or absence of the connection of the light emitting device 60, a determination result of the determination section 34, and a detection result of the abnormality detection section 35. If the light emitting device 60 cannot be used, the detection control section 32 performs setting in which the light emitting device 60 cannot be used. Here, the detection control section 32 may give notification that the light emitting device 60 is unable to use.

The emission control section 33 controls the emitting device driving section 48 and performs or stops the output of the power supply and the pulse signal to the light emitting device 60 connected to the connection section 49. If the light emitting device 60 cannot be used or is not used, the emission control section 33 stops the output of the power supply and the pulse signal of the emitting device driving section 48 by control of the detection control section 32 or by setting that is performed by the function of the setting control section 36. Furthermore, if the light emitting device 60 is used, the emission control section 33 outputs the power supply and the pulse signal of the emitting device driving section 48.

Furthermore, the emission control section 33 controls the emitting device driving section 48 and may determine whether or not the light emitting device 60 is connected to the connection section 49. For example, if the light emitting device 60 is connected to the connection section 49, a resistance value between the pins provided in the connector of the connection section 49 may be changed. In this case, the detection control section 32 can determine the presence or absence of the light emitting device 60 by detecting the resistance value between the pins of the connection section 49 by the emitting device driving section 48. If the light emitting device 60 is not connected, the detection control section 32 stops or does not start the output of the power supply and the pulse signal of the emitting device driving section 48.

The determination section 34 determines the installation state of the projector 10, based on the output value of the posture sensor 47. For example, the determination section 34 determines which of the four installation states illustrated in FIGS. 3A to 3D is currently used.

If abnormality occurs in the operation of the projector 10, the abnormality detection section 35 detects the abnormality. The abnormality detection section 35 realizes a self-diagnostic function of the control section 30 and detects the abnormality that is set in advance in the projector 10. If the abnormality occurs, the abnormality detection section 35 notifies occurrence of the abnormality by projecting the image notifying the abnormality on the projection control section 31, by outputting a notification sound, or by turning on the LED of the operation panel 19. A method of the notification of occurrence of the abnormality is set in advance, for example, associated with the type of the abnormality.

Furthermore, if the abnormality is detected, the abnormality detection section 35 notifies the detection control section 32 of occurrence of abnormality. Here, if the abnormality is detected, the abnormality detection section 35 may notify the detection control section 32 of occurrence of abnormality or may notify the detection control section 32 of occurrence of abnormality only when the predetermined type of abnormality is detected. As the type of the abnormality that is detected by the abnormality detection section 35, for example, temperature abnormality of the light source section 21, temperature abnormality of a substrate on which the image processing system including the control section 30 is mounted or a power supply section (not illustrated) of the projector 10, abnormality of the output value of the posture sensor 47, and the like may be exemplified. In addition, abnormality of the input data of the I/F section 11 and the image I/F section 12, abnormality of communication with the external device connected to the I/F section 11 and the image I/F section 12, an error of software of the control section 30, and abnormality in which the detection control section 32 detects the connection of the light emitting device 60 may be included. Then, if abnormality of a type among those abnormalities affecting the use of the light emitting device 60 occurs, the abnormality detection section 35 may notify the detection control section 32 of the abnormality.

The setting control section 36 provides a setting function regarding the function of the body of the projector 10 to the user. That is, if the setting start is instructed by the operation of the remote control light receiving section 18 or the operation panel 19, the setting control section 36 reads the setting screen data 112 from the storage section 110 and displays the setting screen by the projection control section 31. The setting control section 36 detects the operation that is performed by the remote control light receiving section 18 or the operation panel 19 in the display of the setting screen, performs the setting regarding the function of the projector 10 according to the operation, and updates the setting data 113 indicating the setting contents.

The setting control section 36 may provide the function for performing the setting by the operation of the point bodies 70 and 80 in addition to the remote control light receiving section 18 and the operation panel 19. In this case, if the point operation is performed by the point bodies 70 and 80 onto the setting screen that is projected on the screen SC by the projection control section 31, the setting control section 36 acquires the coordinate of the point position from the position detection section 50, determines the contents of the point operation, and performs the setting thereof.

Here, the emission mode of the light emitting device 60 refers to a mode where the power supply and the pulse signal are supplied from the emitting device driving section 48 to the light emitting device 60 and the light source section 61 is turned on. In addition, a mode where the pulse signal is not input into the light emitting device 60 and the light source section 61 is turned off, but the power supply is supplied may be included in the emission mode. Furthermore, a mode where the power supply is not supplied to the light emitting device 60, but the projector 10 is set to use the light emitting device 60 may be included in the emission mode.

Furthermore, in the narrowest sense, the non-emission mode refers to a mode where the light emitting device 60 is set to be unable to be used in the projector 10. However, a mode where the power supply is not supplied from the emitting device driving section 48 to the light emitting device 60 and/or a mode where the power supply is supplied, but the pulse signal is not supplied and the light source section 61 is turned off may be included in the non-emission mode. In this case, the same mode may not be included in both the emission mode and the non-emission mode.

Figure 4:
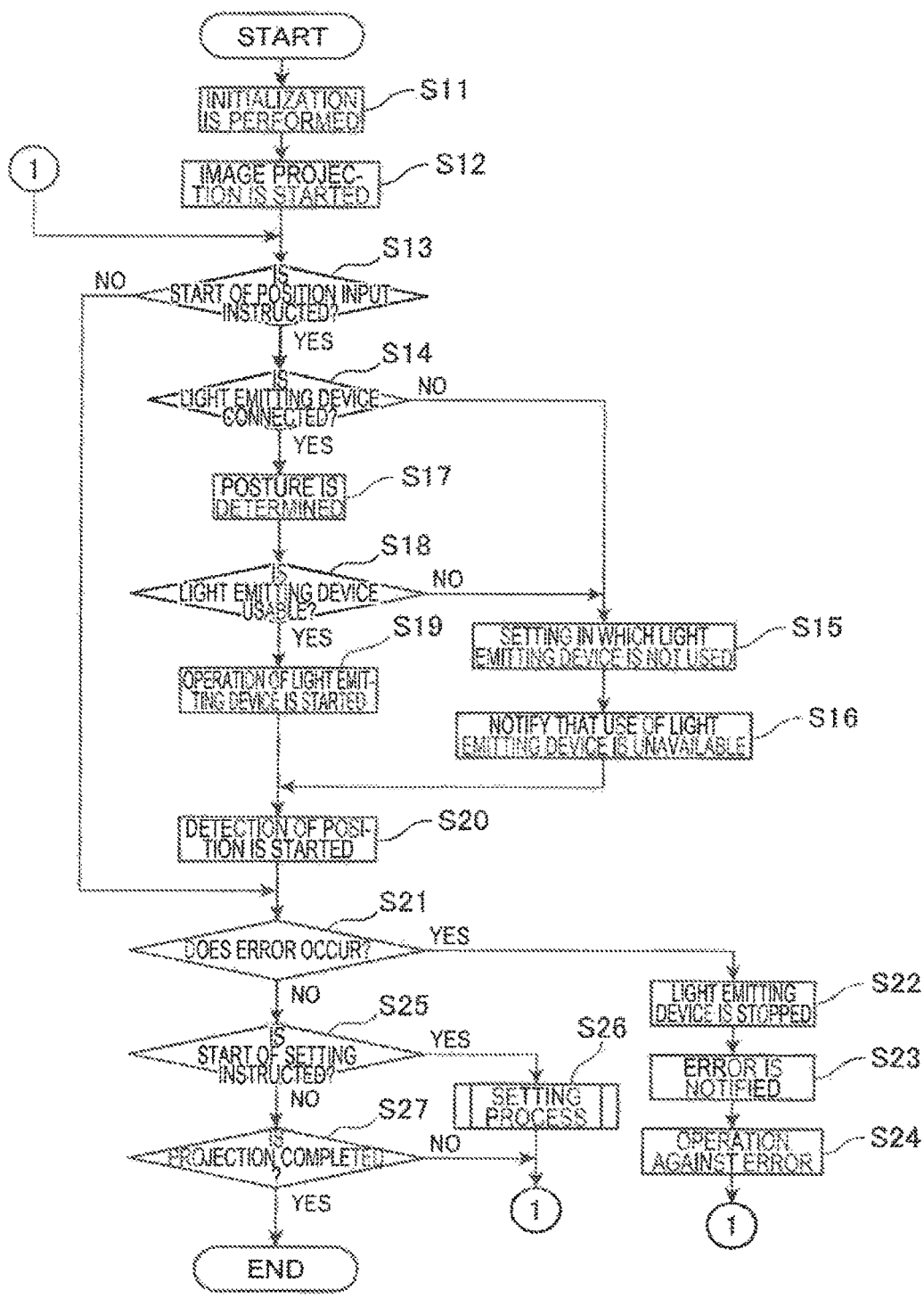
FIG. 4 is a flowchart illustrating an operation of the projector.

FIG. 4 is a flowchart illustrating the operation of the projector 10.

When inputting power supply to the projector 10, the control section 30 performs initialization of each section of the projector 10 and the control section 30 (step S12). In step S11, for example, detection of a connection state of the device in the I/F section 11 and the image I/F section 12, detection of the input image data, initialization of the communication with the device connected to the I/F section 11 and the image I/F section 12, and the like may be performed. In addition, in step S11, for projecting the image, selection of the image to be projected may be performed.

After initialization is completed, the projection of the image is started by the control of the projection control section 31 (step S12). Subsequently, the control section 30 determines whether or not start of the input of the position using the point bodies 70 and 80 is instructed by the operation of the remote control light receiving section 18 or the operation panel 19 (step S13). When the start of the input of the position is instructed (step S13; Yes), a process for detecting the operation of the point bodies 70 and 80 is performed by control of the detection control section 32. That is, the detection control section 32 calls the emission control section 33 and the emission control section 33 determines whether or not the light emitting device 60 is connected to the connection section 49 (step S14). When the emission control section 33 determines that the light emitting device 60 is not connected (step S14; No), the detection control section 32 performs setting in which the light emitting device 60 is not used and a setting value is stored in the storage section 110 (step S15). The setting value set by the emission control section 33 may be included in the setting data 113. According to the setting value set by the detection control section 32, the emission control section 33 performs control so as not to turn on the output of the power supply and the pulse signal of the emitting device driving section 48.

Subsequently, the detection control section 32 notifies that the use of the light emitting device 60 is unavailable (step S16). That is, the detection control section 32 outputs the image for the notification to the projection control section 31 and the projection control section 31 overlaps the image that is output by the detection control section 32 on the input image by the image processing section 40. Thus, the projection section 20 projects the notification regarding the light emitting device 60 onto the screen SC and the user using the projector 10 is notified that the light emitting device 60 cannot be used.

Furthermore, if the emission control section 33 determines that the light emitting device 60 is connected (step S14; Yes), the detection control section 32 calls the determination section 34. The determination section 34 determines the posture of the projector 10 based on the output value of the posture sensor 47 (step S17). The determination section 34 specifies the posture of the projector 10 and determines whether or not the posture (for example, FIGS. 3A and 3C) of the specified projector 10 is capable of using the light emitting device 60 (step S18). Here, if the determination section 34 determines that it is not a posture capable of using the light emitting device 60 (step S18; No), the process proceeds to step S15 and the detection control section 32 performs setting in which the light emitting device 60 is not used.

On the other hand, if the determination section 34 determines that it is a posture capable of using the light emitting device 60 (step S18; Yes), the detection control section 32 calls the emission control section 33 and starts the output of the power supply and the pulse signal of the emitting device driving section 48 (step S19). In step S19, the light emitting device 60 receives the power supply and the pulse signal from the connection section 49, and starts the operation.

The detection control section 32 controls the position detection section 50 and starts the detection of the point position of the point bodies 70 and 80 based on the photographed image data of the imaging section 51 (step S20). In step S20, the detection control section 32 transmits the synchronization signal from the transmission section 52 to match the photographing timing of the imaging section 51 and may perform the adjustment of the light emitting timing of the pointing body 70.

Furthermore, after the detection control section 32 notifies that the use of the light emitting device 60 is unavailable in step S16, the process proceeds to step S20, and the detection control section 32 starts the detection of the position of the pointing body 70. If the light emitting device 60 cannot be used, the operation by the pointing body 80 cannot be performed, but the operation using the pointing body 70 can be performed. Thus, the detection control section 32 controls the position detection section 50 and starts the detection of the position of the pointing body 70.

After the detection of the position is started in step S20, or if the start of the input of the position is not instructed (step S13; No), the detection control section 32 determines whether or not occurrence of abnormality is notified by the abnormality detection section 35 (step S21). If the abnormality is detected or the abnormality of the type that is set in advance is detected, the abnormality detection section 35 notifies the detection control section 32 of the abnormality. If the notification is performed from the abnormality detection section 35, the detection control section 32 calls the emission control section 33 and stops the light emitting device 60 (step S22). In step S22, the emission control section 33 controls the emitting device driving section 48 and stops the output of the power supply and the pulse signal. If the light emitting device 60 is not used in steps S21 and S22, the operation state of the emission control section 33 and the emitting device driving section 48 is not changed.

Subsequently, the detection control section 32 notifies that error (abnormality) has occurred and the light emitting device 60 cannot be used by the error (step S23). The notification may be performed by projecting the image by the projection control section 31 or by turning on the LED of the operation panel 19, but the notification sound may be output.

Thereafter, the control section 30 performs the operation corresponding to the abnormality that has occurred. For example, if a temperature abnormality of the light source section 21 is detected, the projection control section 31 controls the light source driving section 45 so as to turn off the light source section 21 or to decrease the brightness of the light source section 21. As described above, in order to eliminate the abnormality that has occurred or to prevent failure of the projector 10 caused by the abnormality, the control section 30 performs the operation that is set in advance.

If the abnormality is eliminated or recovered and the operation of step S24 is completed, and then the projector 10 enters a state of being capable of normal operation, the control section 30 returns to step S13.

Moreover, the operation of step S21 is not limited to the flow control and may be performed by an interrupt control. That is, the abnormality detection section 35 always monitors occurrence of the abnormality during the operation of the projector 10 and if the abnormality detection section 35 detects the abnormality, step S21 may be performed by the interrupt control.

Thereafter, the setting control section 36 determines whether or not the function setting of the projector 10 is instructed by the operation of the remote control light receiving section 18 or the operation panel 19 (step S25). If the function setting is instructed, the setting control section 36 performs a setting process (described below) (step S26) and returns to step S13.

Furthermore, if the function setting is not instructed, the control section 30 determines whether or not the completion of the projection is instructed by the operation of the remote control light receiving section 18 or the operation panel 19 (step S27). If the completion of the projection is instructed, the control section 30 performs a series of processes for ending the projection and the process is completed. Furthermore, if the completion of the projection is not instructed, the control section 30 returns to step S13.

The processes of steps S13, S25, and S27 are not limited to a case of being performed by the flow control similarly to step S21, maybe performed by the interrupt control. That is, if start of the input of the position is instructed by the operation of the remote control light receiving section 18 or the operation panel 19, step S13 may be started as the interrupt control and steps S25 and S27 are also the same. Therefore, the process of each step illustrated in FIG. 4 may not be performed in the sequence illustrated in FIG. 4.

Figure 5:
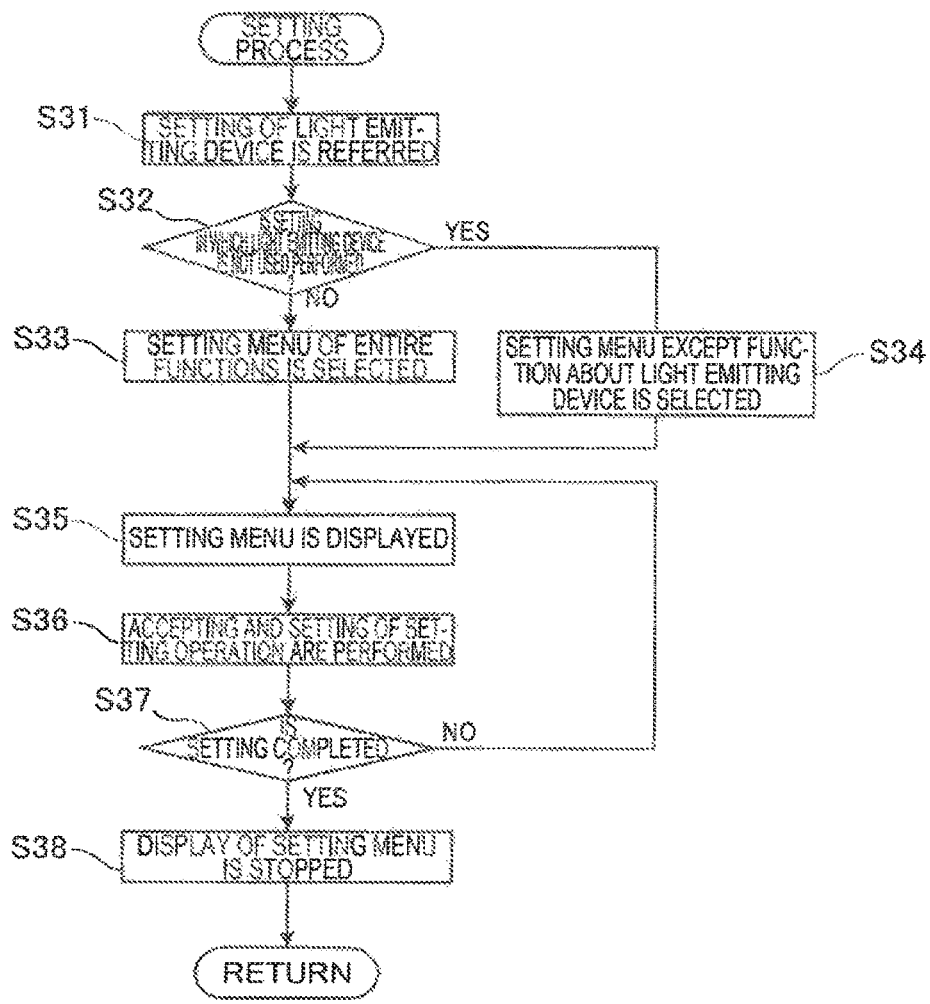
FIG. 5 is a flowchart illustrating in detail a setting process of the projector.

FIG. 5 is a flowchart illustrating in detail the setting process of the projector 10.

The setting control section 36 refers to setting of use/disuse of the light emitting device 60 that is set by the detection control section 32 (step S31). The use/disuse of the light emitting device 60 is set in step S15 (FIG. 4) and, for example, the setting value is stored in the storage section 110. The setting control section 36 determines whether or not the setting in which the light emitting device 60 is not used is performed (step S32).

If the setting in which the light emitting device 60 is not used is not performed (step S32; No), that is, the light emitting device 60 is capable of being used, the setting control section 36 selects data of a setting menu corresponding to the setting of the entire functions from the setting screen data 112 (step S33). On the other hand, if setting in which the light emitting device 60 is not used is performed (step S32; Yes), the setting control section 36 selects data of the setting menu corresponding to the setting except for the functions regarding the light emitting device 60 from the setting screen data 112 (step S34).

The setting control section 36 projects the setting screen configuring the selected setting menu on the screen SC by the function of the projection control section 31 (step S35). The setting control section 36 performs the setting with respect to articles of the setting screen according to the operation of the remote control light receiving section 18 or the operation panel 19, and updates the setting data 113 based on the setting value (step S36). Therefore, for the function of the projector 10, contents that are desired by the user are set.

The setting control section 36 determines whether or not the setting completion is instructed by the operation of the remote control light receiving section 18 or the operation panel 19 (step S37). If the setting completion is instructed (step S37; Yes), the setting control section 36 stops the display of setting screen by the projection control section 31 (step S38) and the process returns to step S13 of FIG. 4. In addition, if the setting completion is not instructed, the setting control section 36 returns to step S35.

Figure 6A:
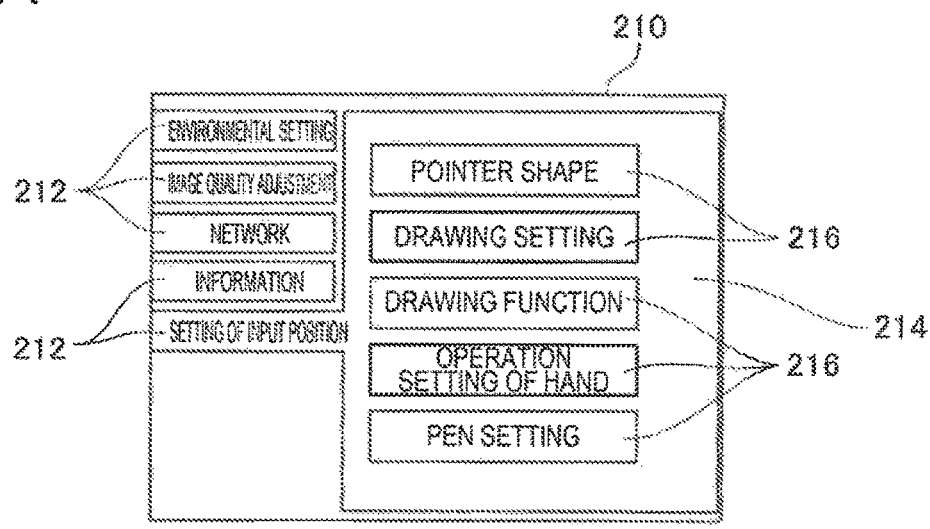
FIGS. 6A and 6B are views illustrating an example of a setting screen.
Figure 6B:
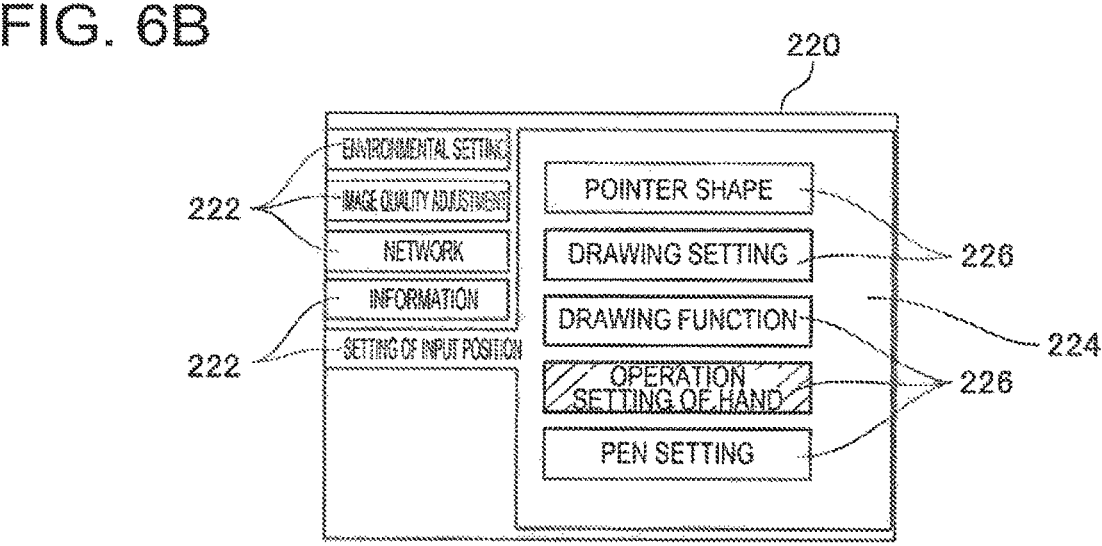

FIGS. 6A and 6B are views illustrating an example of the setting screen configuring the setting menu.

A setting screen 210 illustrated in FIG. 6A is a screen configuring the setting menu corresponding to all of the functions. The setting menu has article tabs 212 to select a major classification of the setting articles and has a hierarchical structure associated with a detailed setting screen 214 in each article tab 212. If the user selects any one of the article tabs 212, the detailed setting screen 214 corresponding to the selected article tab 212 is displayed. In the detailed setting screen 214 illustrated in FIG. 6A, setting articles 216 are arranged. If operation for selecting the setting article is performed, a setting value of each setting article is capable of being input. In the example of FIG. 6A, as the setting articles regarding the input operation of the position of the point bodies 70 and 80, "pointer shape", "drawing setting", "drawing function", "operation setting of the hand", and "pen setting" are arranged. The article of the pointer shape sets the shape of the pointer projected on the screen SC so as to follow the point position of the point bodies 70 and 80. In the article of the drawing setting, necessity or non-necessity of a function performing the drawing is set based on the point position of the point bodies 70 and 80. In the article of the drawing function, contents of a function performing the drawing are set based on the point position of the point bodies 70 and 80. In the article of the operation setting of the hand, necessity or non-necessity of the detection of the position of the pointing body 80 and contents thereof are set. In the article of the pen setting, necessity or non-necessity of the detection of the position of the pointing body 70 and contents thereof are set.

A setting screen 220 illustrated in FIG. 6B is a screen configuring the setting menu corresponding to setting except the function regarding the pointing body 80. The setting menu has article tabs 222 similar to the setting menu illustrated in FIG. 6A and has a hierarchical structure associated with a detailed setting screen 224 in each article tab 222. In the detailed setting screen 224 illustrated in FIG. 6B, setting articles 226 are arranged. In the example of FIG. 6B, similar to FIG. 6A, "pointer shape", "drawing setting", "drawing function", "operation setting of the hand", and "pen setting" are arranged. Since the setting screen 220 is the setting menu except for the function regarding the pointing body 80, the setting of the function using the pointing body 80 cannot be performed. That is, the setting article of "operation setting of the hand" in the detailed setting screen 224 is displayed in gray or another dark color. The "operation setting of the hand" cannot be selected by the operation of the remote control light receiving section 18 and the operation panel 19 in the display of the detailed setting screen 224. That is, the setting control section 36 cannot receive the setting of the "operation setting of the hand" in the display of the detailed setting screen 224. Therefore, if the light emitting device 60 cannot be used, setting regarding the function of the light emitting device 60 is not performed.

Furthermore, even though not illustrated, if "pointer shape", "drawing setting", and "drawing function", that are other setting articles disposed in the detailed setting screen 224 are selected, the screen in which the setting value regarding the pointing body 80 cannot be selected is displayed.

As described above, the projection system 1 according to the embodiment to which the invention is applied includes the projector 10 and the light emitting device 60 emitting the detection light in a direction corresponding to the screen SC. The projector 10 detects the operation to the screen SC by the position detection section 50 based on the detection light of the light emitting device 60 and switches the light emitting device 60 between the emission mode and the non-emission mode in response to the state of the projector by the emission control section 33. Therefore, the projector 10 detecting the operation by using the detection light emitted by the light emitting device 60 switches the detection light between the emission mode and the non-emission mode by the state of the projector 10. Thus, if the detection light is not necessary, the emission of the detection light is not appropriate, or the like, it is possible to stop the emission of the detection light and it is possible to suppress power consumption and to increase the lifetime of the light source section 61.

Furthermore, the emission control section 33 switches the light emitting device 60 between the emission mode and the non-emission mode in response to the installation state of the body of the projector 10. Thus, it is possible to stop the emission of the detection light in a case where the detection light is not necessary, a case where emission of the detection light is not appropriate, or the like without a complicated operation.

Furthermore, since the emission control section 33 switches the light emitting device 60 to the non-emission mode when the abnormal operation (error) of the type set in the projector 10 in advance is detected by the abnormality detection section 35, it is possible to prevent emission of unnecessary detection light. Furthermore, in an operation for returning the projector 10 from the abnormal operation, it is possible to eliminate labor to stop the emission of the detection light and to improve operation efficiency.

Furthermore, the projector 10 includes the setting control section 36 accepting the setting operation in a state where the setting screen is projected on the screen SC. Since the setting control section 36 does not accept the setting operation of the function regarding the light emitting device 60 in a case where the light emitting device 60 is in the non-emission mode, that is, is not capable of being used, it is possible to prevent setting of a function that cannot be realized.

Thus, for example, the setting control section 36 does not accept the setting operation of the function regarding the light emitting device 60 when the setting control section 36 cannot detect that the light emitting device 60 is connected. More specifically, a case where the light emitting device 60 is not connected to the emitting device driving section 48 is exemplified.

Furthermore, the position detection section 50 can effectively detect the operation by using the reflected light from the detection light on the pointing body 80 that performs an operation to the screen SC. Furthermore, it is possible to prevent unnecessary emission by making the light emitting device 60 be in the non-emission mode when the emission of the detection light is not necessary such as when the projector 10 does not detect the operation.

Furthermore, the position detection section 50 has the function for detecting the reflected light reflected by the pointing body 80 and the function for detecting the light emitted by the pointing body 70 that performs an operation to the screen SC. The detection control section 32 detects the operation of the pointing body 70 and the operation of the pointing body 80 by distinguishing the operations based on a difference between the timing at which the pointing body 70 emits light and timing at which the light emitting device 60 emits the detection light. Thus, it is possible to use a plurality of mixed point bodies and to detect the operations of each pointing body by distinguishing the operations.

Here, the emission control section 33 may control emission of the light emitting device 60 so that the timing at which the pointing body 70 emits the light and the timing at which the light emitting device 60 emits the detection light do not match each other. Furthermore, the detection control section 32 transmits the infrared signal for synchronization with respect to the pointing body 70 by the position detection section 50 as the unit for instructing the timing at which the pointing body 70 emits the light.

According to the methods, the adjustment between the timing at which the pointing body 70 emits the light and the timing at which the pointing body 80 reflects the detection light is performed and it is possible to further reliably detect the operation of the pointing body 70 and the operation of the pointing body 80 by distinguishing the operations.

Furthermore, the light emitting device 60 is configured as a separate body from the body of the projector 10 and is connected to the connection section 49. The projector 10 can switch the light emitting device 60, which is the separate body from the body of the projector 10, between the emission and the non-emission thereof by the control of the detection control section 32.

Moreover, the embodiment described above is only a specific aspect to which the invention is applied and does not limit the invention, and it is possible to apply the invention as aspect different from the embodiment described above. In the embodiment described above, an example in which the light emitting device 60 is set to be unable to use by the control of the detection control section 32 if the light emitting device 60 is not connected and if the posture of the projector 10 is not appropriate for the use of the light emitting device 60 is described. The invention is not limited to the example and, for example, the light emitting device 60 may be set to be unable to use if failure of the light emitting device 60 is detected, if the number of the point bodies 70 during the use reaches the limit, and the like.

Furthermore, in the embodiment described above, the configuration in which the light emitting device 60 is configured as a separate body from the body of the projector 10 and is connected by the cable is exemplified, but the invention is not limited to the embodiment. For example, a configuration is possible in which the light emitting device 60 may be integrally mounted on the body of the projector 10 and may be built in the body of the projector 10. Furthermore, the light emitting device 60 receives power supply from the outside and may be connected between the emitting device driving section 48 and the light emitting device 60 by a wireless communication line.

Furthermore, in the embodiment, the position detection section 50 specifies the position of the pointing body 70 by photographing the screen SC by the imaging section 51, but the invention is not limited to the embodiment. For example, the invention is not limited to the case where the imaging section 51 is provided in the body of the projector 10 and the projection direction of the projection optical system 23 is photographed. The imaging section 51 may be disposed as a separate body from the body of the projector 10 and the imaging section 51 may perform photographing from the side or front of the screen SC. Furthermore, a plurality of imaging sections 51 are disposed and the detection control section 32 may detect the positions of the point bodies 70 and 80, based on the photographed image data of the plurality of imaging sections 51. Furthermore, a system in which the pointing body 80 is detected based on the photographed image of the imaging section 51 and the detection of the position of the pointing body 70 is performed by electromagnetic waves such as ultrasonic waves maybe employed. Furthermore, in the embodiment described above, the pen type pointing body 70 is exemplified, but the pointing body 70 may be a laser pointer, a pointing rod, or the like, and the shape or the size thereof is not limited.

Furthermore, in the embodiment described above, as the optical modulation device 22 modulating the light emitted by the light source, the configuration in which three transmissive liquid crystal panels corresponding to each color of RGB are used is exemplified, but the invention is not limited to the embodiment. For example, a configuration in which three reflective liquid crystal panels are used may be provided and a system in which one liquid crystal panel and a color wheel are combined may be used. Otherwise, a configuration may be provided by a system in which three digital mirror devices (DMD) are used, a DMD system in which one digital mirror device and the color wheel are combined, and the like. In a case where only one liquid crystal panel or the DMD is used as the optical modulation device, a member corresponding to the combination optical system such as the cross dichroic prism is not necessary. Furthermore, an optical modulation device that is capable of modulating the light emitted by the light source can be employed without problem in addition to the liquid crystal panel and the DMD.

Furthermore, each functional section of the projection system 1 illustrated in FIG. 2 represents a functional configuration and a specific embodiment is not specifically limited. That is, hardware individually corresponding to each functional section is not necessarily mounted and, of course, a configuration in which one processor performs the program and thereby the functions of a plurality of functional sections are realized may be provided. Furthermore, in the embodiment described above, a part of the functions realized by the software may be realized by the hardware or a part of the functions realized by the hardware may be realized by the software. In addition, other specific detailed configurations of each section of the projection system 1 may also arbitrarily be changed without departing from the gist of the invention.

What is claimed is:

1. A projector that projects an image on a projection surface, the projector comprising:
   a detection section that detects an operation to the projection surface; and
   an emission control section that causes a light emitting section to be in a non-emission mode when an error occurs in the projector,
   the light emitting section emitting detection light that is used for detection by the detection section.

2. The projector according to claim 1, further comprising:
   a setting control section that accepts a setting operation in a state where a setting screen is projected on the projection surface,
   wherein the setting control section does not accept the setting operation of a function regarding the light emitting section when the light emitting section is in the non-emission mode by the emission control section.

3. The projector according to claim 2,
   wherein the setting control section does not accept the setting operation of a function regarding the light emitting section when connection of the light emitting section cannot be detected.

4. The projector according to claim 1,
   wherein the detection section detects reflected light that is made by the detection light reflected on a pointing body that performs an operation to the projection surface.

5. The projector according to claim 4,
   wherein the detection section has a function for detecting the reflected light reflected on the pointing body and a function for detecting light emitted by a light-emitting pointing body that performs an operation to the projection surface, and detects an operation of the light-emitting pointing body and an operation of the pointing body by distinguishing the operation of the light-emitting pointing body and the operation of the pointing body based on a difference between timing at which the light-emitting pointing body emits the light and timing at which the light emitting section emits the detection light.

6. The projector according to claim 5,
wherein the emission control section controls emission of the light emitting section so that the timing at which the light-emitting pointing body emits the light and the timing at which the light emitting section emits the detection light do not match each other.

7. The projector according to claim 5, further comprising:
a unit that gives the light-emitting pointing body an instruction on the timing at which the light-emitting pointing body emits the light.

8. The projector according to claim 1,
wherein the light emitting section that is configured as a separate body from a body of the projector is connected to the projector.

9. A projection system comprising:
a projector that projects an image on a projection surface; and
a light emitting device that is connected to the projector and emits detection light in a direction toward the projection surface,
wherein the projector includes
a detection section that detects an operation to the projection surface based on the detection light of the light emitting device, and
an emission control section that causes the light emitting section to be in a non-emission mode when an error occurs in the projector.

10. A method of controlling a projector projecting an image on a projection surface, the method comprising:
detecting an operation to the projection surface, based on detection light emitted in a direction toward the projection surface by a light emitting section; and
switching a mode of the light emitting section to a non-emission mode when an error occurs in the projector.

* * * * *